(12) United States Patent
Chong et al.

(10) Patent No.: US 10,033,419 B1
(45) Date of Patent: Jul. 24, 2018

(54) TERMINATION FOR SINGLE-ENDED RECEIVER

(71) Applicants: Euhan Chong, Ottawa (CA); Shayan Shahramian, Richmond Hill (CA); Behzad Dehlaghi, Richmond Hill (CA); Anthony Chan Carusone, Burlington (CA)

(72) Inventors: Euhan Chong, Ottawa (CA); Shayan Shahramian, Richmond Hill (CA); Behzad Dehlaghi, Richmond Hill (CA); Anthony Chan Carusone, Burlington (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/413,508

(22) Filed: Jan. 24, 2017

(51) Int. Cl.
H04B 1/16 (2006.01)

(52) U.S. Cl.
CPC ..................................... H04B 1/16 (2013.01)

(58) Field of Classification Search
USPC .......................................... 323/283; 330/253
See application file for complete search history.

(56) References Cited

U.S. PATENT DOCUMENTS

| | | | |
|---|---|---|---|
| 7,652,460 B2* | 1/2010 | Chang | H02M 3/157 323/224 |
| 8,829,995 B2* | 9/2014 | Cohen | H03F 3/45183 330/253 |
| 9,270,314 B1 | 2/2016 | Mak et al. | |
| 2006/0115280 A1* | 6/2006 | Chang | H04B 10/66 398/208 |
| 2008/0067994 A1* | 3/2008 | Kesterson | H02M 3/33507 323/283 |
| 2012/0218051 A1* | 8/2012 | Zabinski | H01P 5/12 333/33 |
| 2014/0253207 A1 | 9/2014 | Ruberg et al. | |
| 2017/0097613 A1* | 4/2017 | Tertinek | G04F 10/005 |

FOREIGN PATENT DOCUMENTS

CN     105591660 A     5/2016

* cited by examiner

*Primary Examiner* — Eva Puente

(57) ABSTRACT

Described herein is a termination circuit for a receiver receiving a single-ended signal. The termination circuit includes the first stage having a low-pass transfer function having a first pole/zero pair, and a second stage coupled to the first stage, where the second stage has a high-pass transfer function having a second pole/zero pair that cancels out the first pole/zero pair.

20 Claims, 5 Drawing Sheets

TERMINATION FOR SINGLE-ENDED RECEIVER

FIELD

The present disclosure relates to a low power transceiver device. In particular, examples described herein relate to a single-ended transceiver device for achieving high bandwidth and/or high density at low power. Examples described herein may be useful for ultra-short reach (USR) applications, and may also apply to ultra-short serializer/deserializers.

BACKGROUND

In terminating an output of electronic circuits, there are a few common approaches. Examples approaches are demonstrated in FIGS. 1A and 1B where the circuit is DC terminated by either pulling the output to ground, as shown in FIG. 1A, or pulling the output to a supply voltage $V_{DD}$, as shown in FIG. 1B. In these examples, the pull-up or pull-down resistor is labeled as $R_{RX}$. The DC termination typically provides good performance and return loss across all frequencies. Nevertheless, DC termination is generally avoided in circuits requiring low power due to the higher power consumption at the transmitting (TX) driver. DC termination also typically requires a reference voltage $V_{ref}$ for defining the receiver (RX) slicing point (not shown) which also may change with swing of the output. This problem may be resolved with a simple resistor-capacitor (RC) circuit. However, at low data rates, such solution may exhibit problems with consecutive identical digits (CIDs). DC termination also typically exhibits an asymmetry in the eye (e.g. rise and fall times are different), which may cause the transmitter to also exhibit asymmetric properties.

Another approach to terminating the output of electronic circuits is AC coupled termination as demonstrated in FIGS. 1C and 1D. The approach presented in FIG. 1C provides AC termination that resolves some of the power consumption problems of DC termination by requiring only half the power. AC termination also requires no generation of a reference voltage. However, AC termination typically suffers from DC wander. As well, tracking CIDs, particularly at low data rates, typically requires a large capacitor (which may be too large for practical implementation). Further, AC termination may have poor low frequency termination.

The DC wander exhibited by FIG. 1C may be corrected by adding a voltage regulator 102, as shown in FIG. 1D. However, this is at the cost of higher power consumption for both the TX driver and RX regulator for singled-ended receiving. The voltage regulator 102 also requires area on the semiconductor device. The voltage regulator 102 may also become unstable in certain instances.

SUMMARY

The present disclosure describes circuits that may be useful for single-ended transceivers, including ultra-short reach (USR) transceivers (TXRX) where the goal is to achieve high bandwidth and high density at low power consumption. For example, a low power usage target may be less than about 2 pJ/bit, for example about 1.5 pJ/bit.

In some first examples, the present disclosure describes a termination circuit for a receiver receiving a single-ended signal, the termination circuit comprising:

a first stage for receiving input from an input port of the receiver, the first stage having a low-pass transfer function having a first pole/zero pair; and a second stage for outputting to one or more further stages of the receiver, the second stage being coupled to the first stage, the second stage having a high-pass transfer function, the high-pass transfer function having a second pole/zero pair that cancels out the first pole/zero pair.

In one aspect of those examples, the first stage comprises a first resistor in series with a first capacitor, the first resistor and the first capacitor being coupled between the input port and ground.

In one aspect of those examples, the first resistor has a resistance of approximately 50 Ω+/−20%.

In one aspect of those examples, the first capacitor has a capacitance in the range of approximately 50 pF to approximately 500 pF.

In one aspect of those examples, the capacitance of the first capacitor is approximately 100 pF.

In one aspect of those examples, the second stage comprises a second capacitor coupled to the input port and an output of the termination circuit, and a second resistor in series with a third capacitor, the second resistor and the third capacitor being coupled between the output of the termination circuit and ground.

In one aspect of those examples, the second capacitor and the third capacitor have approximately equal capacitance.

In one aspect of those examples, wherein the first resistance, second resistance, first capacitance, and second capacitance are selected to satisfy the condition $2R_1C_1=R_2C_2$, where $R_1$ is resistance of the first resistor, $C_1$ is capacitance of the first capacitor, $R_2$ is resistance of the second resistor, $C_2$ is capacitance of the second capacitor, and the third capacitor has capacitance approximately equal to capacitance of the second capacitor.

In one aspect of those examples, wherein $R_1=50\Omega$, $C_1=100$ pF, $C_2=1$ pF, and $R_2=10$ kΩ.

In one aspect of those examples, wherein the termination circuit consumes power less than approximately 2 pJ/bit.

In some second examples, the present disclosure describes a receiver for receiving a single-ended signal, the receiver comprising:

an input port for receiving the single-ended signal;
a termination circuit comprising:
a first stage coupled to the input port of the receiver, the first stage having a low-pass transfer function having a first pole/zero pair; and
a second stage coupled to the first stage, the second stage having a high-pass transfer function, the high-pass transfer function having a second pole/zero pair that cancels out the first pole/zero pair; and
one or more further stages coupled to output of the termination circuit, for processing the single-ended signal.

In one aspect of those examples, the first stage of the termination circuit comprises a first resistor in series with a first capacitor, the first resistor and the first capacitor being coupled between the input port and ground.

In one aspect of those examples, wherein the second stage of the termination circuit comprises a second capacitor coupled between the input port and one of the one or more further stages, and a second resistor in series with a third capacitor, the second resistor and the third capacitor being coupled between the one of the one or more further stages and ground.

In one aspect of those examples, wherein the first resistance, second resistance, first capacitance, and second capacitance are selected to satisfy the condition $2R_1C_1=R_2C_2$, where $R_1$ is resistance of the first resistor, $C_1$ is capacitance of the first capacitor, $R_2$ is resistance of the second resistor, $C_2$ is capacitance of the second capacitor, and the third capacitor has capacitance approximately equal to capacitance of the second capacitor.

In one aspect of those examples, the termination circuit consumes power less than approximately 2 pJ/bit.

In some third examples, the present disclosure describes a low-power communication device comprising a receiver, wherein the receiver comprises:

an input port of the receiver for receiving a single-ended signal;

a termination circuit comprising:

a first stage coupled to the input port of the receiver, the first stage having a low-pass transfer function having a first pole/zero pair; and a second stage coupled to the first stage, the second stage having a high-pass transfer function, the high-pass transfer function having a second pole/zero pair that cancels out the first pole/zero pair; and one or more further stages of the receiver coupled to output of the termination circuit, for processing the single-ended signal.

In one aspect of those examples, the first stage of the termination circuit comprises a first resistor in series with a first capacitor, the first resistor and the first capacitor being coupled between the input port and ground.

In one aspect of those examples, the second stage of the termination circuit comprises a second capacitor coupled between the input port and one of the one or more further stages, and a second resistor in series with a third capacitor, the second resistor and the third capacitor being coupled between the one of the one or more further stages and ground.

In one aspect of those examples, the first resistance, second resistance, first capacitance, and second capacitance are selected to satisfy the condition $2R_1C_1=R_2C_2$, where $R_1$ is resistance of the first resistor, $C_1$ is capacitance of the first capacitor, $R_2$ is resistance of the second resistor, $C_2$ is capacitance of the second capacitor, and the third capacitor has capacitance approximately equal to capacitance of the second capacitor.

In one aspect of those examples, the termination circuit consumes power less than approximately 2 pJ/bit.

Additional aspects may become apparent to one of skill in the art and the common general knowledge in light of the disclosure presented herein.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Examples described herein may be applicable to a single-ended USR TXRX that may enable high bandwidth at a low power. Examples described herein may also enable high density implementation on a chip. In some examples, a very low power usage may be achieved, which may be less than 2 pJ/bit, for example approximately 1.5 pJ/bit.

In order to achieve low power consumption, a transmitter may be designed to transmit signals as a single-ended mode signal rather than using differential signaling. Further, AC coupled RX termination may be preferable for low power consumption. Conventional AC coupled termination may be suitable for differential signals, because the common-mode of the differential signal is constant, however such approaches may not be suitable for single-ended signaling. In contrast to differential signaling, the RX termination common-mode in single-ended signaling is data-dependent, which may lead to DC wander and eye closure.

Figure 1B:
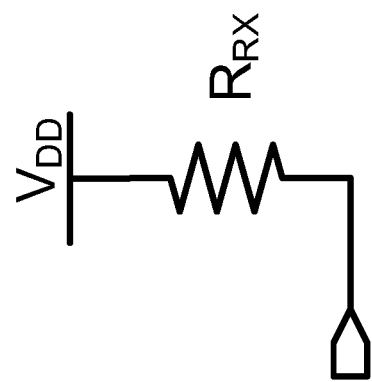
FIG. 1B is a schematic diagram demonstrating a prior art DC termination with a pull-up resistor $R_{RX}$.
Figure 1A:
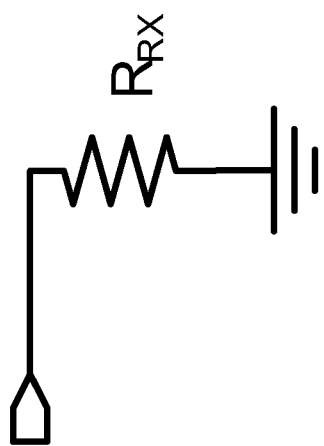
FIG. 1A is a schematic diagram demonstrating a prior art DC termination with a pull-down resistor $R_{RX}$.
Figure 1D:
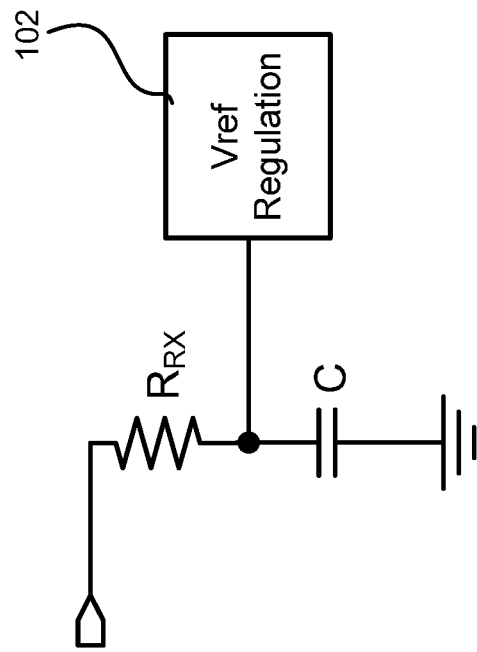
FIG. 1D is a schematic diagram demonstrating a prior art low-pass filter termination with voltage regulation.
Figure 1C:
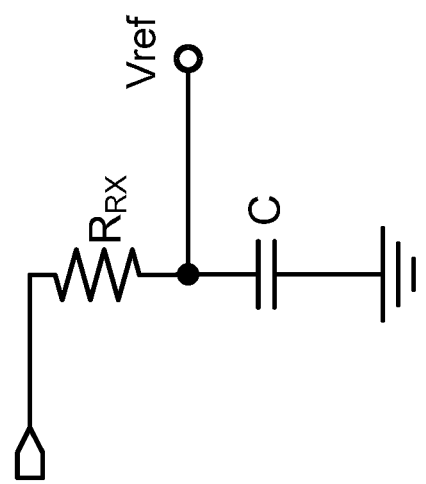
FIG. 1C is a schematic diagram demonstrating a prior art low-pass filter termination.
Figure 2:
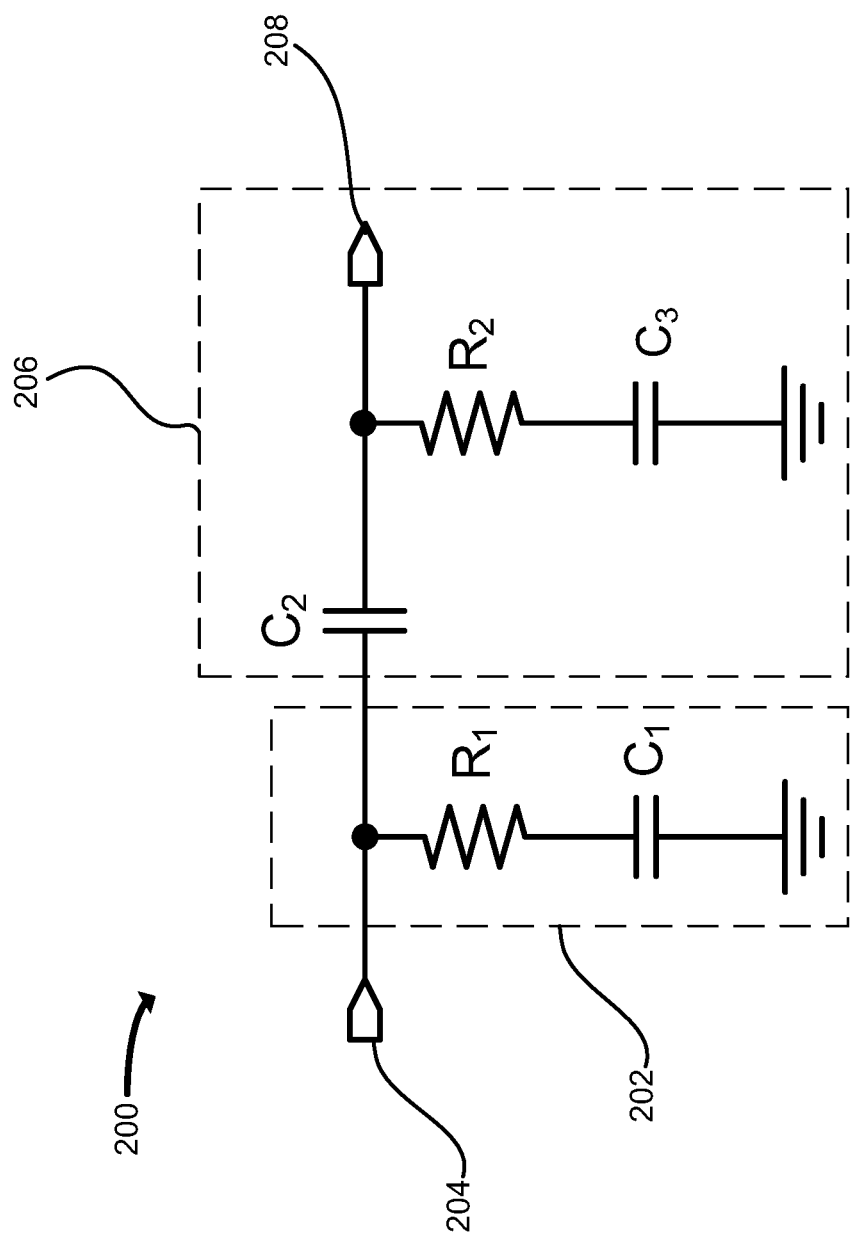
FIG. 2 is a schematic diagram of an example termination circuit with AC coupling termination.

FIG. 2 is a schematic diagram of an example AC coupled RX termination circuit 200 that may address one or more of the challenges discussed above. The example termination circuit 200 may be implemented at a RX (which may be part of a TXRX), for example. The example circuit 200 provides a two-stage RX termination circuit that may have an all-pass (or near all-pass) transfer function. An input signal is received at an input port 204 of the RX, at a first stage 202 of the termination circuit 200. The first stage 202 may include a first resistor $R_1$ (which may be referred to as the RX termination resistor) in series with a first capacitor $C_1$, connecting the input port 204 to ground. The first resistor $R_1$ may have a resistance value that is selected to avoid or reduce far-end mismatch, for example having a resistance of 40-60Ω, or about 50Ω. The capacitance of the first capacitor may be selected to provide good return loss, and may be relatively large. The capacitance of the first capacitor may be selected dependent on the value of the first resistor $R_1$, and may be in the range of about 50 pF to about 500 pF, for example about 100 pF. This first stage 202 may have a low-pass transfer function which may result in inter-symbol interference (e.g., causing eye closure) and/or additive noise for single-ended input data.

The second stage 206 may include a second capacitor $C_2$ coupled to the input port 204 and an output port 208 of the termination circuit 200. The capacitance of the second capacitor may be selected dependent on the value of the resistance and capacitance values of the first stage 204, and may be in the range of about 500 fF to about 2 pF, for example about 1 pF. The output port 208 of the termination circuit 200 may be coupled to other stages of a RX for signal processing, for example a continuous time linear equalizer (CTLE), a gain stage, a boost stage, or a comparator. Within the termination circuit 200, the output port 208 is further coupled to a second resistor $R_2$ in series with a third capacitor $C_3$ connected to ground. The third capacitor $C_3$ may have the same capacitance value as second capacitor $C_2$. The second stage 206 may provide a high-pass transfer function having a pole/zero pair that cancels out the pole/zero pair of the first stage 204, resulting in a generally flat transfer function overall for the circuit 200, which reduces or eliminates DC wander for input data with long CIDs.

In general, the termination circuit 200 may be designed as two stages in which the pole/zero pair of the second stage 206 cancels out the pole/zero pair of the first stage 204, to result in a generally flat transfer function for the termination circuit 200.

In particular, the following conditions have been found to enable the termination circuit 200 to maintain a flat response:

$$C_2 = C_3; \text{ and}$$

$$2R_1C_1 = R_2C_2$$

In order to meet these conditions, the ratio of the first and second resistors $R_1$ and $R_2$ may be matched with the ratio of the first and second capacitors $C_1$ and $C_2$ ratios. Although these meeting these conditions may ensure a flat response, a completely flat response may not be practical or necessary in practice. For example, the resistance and capacitance values of individual components may randomly vary (e.g., due to variations in manufacturing) by up to 20% from the nominal value. In the case where these ratios are not matched, the impact of such mismatch may be acceptable since simulations have shown that the impact of such mismatch typically occurs at lower frequencies. The size of the capacitors $C_1$, $C_2$, $C_3$ may be scaled to fit the desired low frequency return loss specification. The capacitance values of the capacitors $C_1$, $C_2$, $C_3$ may also be selected depending on the application and the area available. In an example implementation, suitable capacitance values may be $C_1=100$ pF and $C_2=C_3=1$ pF, and a variation of up to five times these capacitance values may be acceptable.

The example circuit 200 may occupy a relatively compact space when implemented on an integrated circuit, because there are relatively few components in the first and second stages 202, 206.

Figure 3:
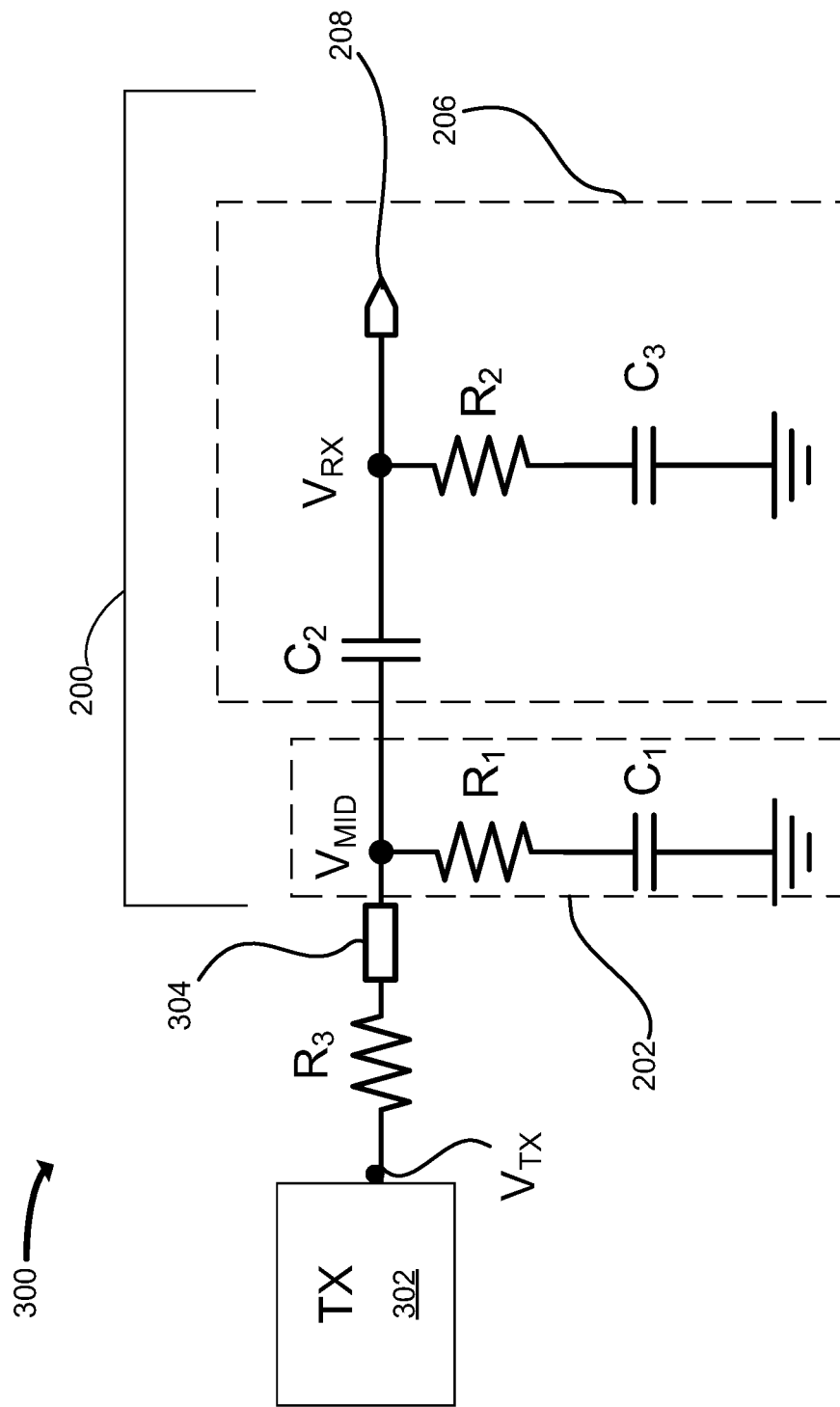
FIG. 3 is a schematic diagram of example system including the termination circuit of FIG. 2.

FIG. 3 is a schematic diagram of a transmitter and receiver system 200 including the example AC coupled termination circuit 200 of FIG. 2. The example system 300 includes a TX driver 302 coupled to the termination circuit 200 of a RX via a transmission channel 304. Output from the TX driver 302 may travel through a third resistor $R_3$, which may be a TX termination resistor, for example having a resistance of 40-60Ω or about 50Ω.

The transfer function for this example system 300 may be given by:

$$\frac{V_{RX}}{V_{TX}} = (1 + sR_1C_1)\left(1 + \frac{sR_2C_2}{(1+sR_2C_2)(2+sR_2C_2)}\right)$$

As in the example circuit 200, the following conditions have been found to enable the system 300 to maintain a flat response:

$$C_2 = C_3; \text{ and}$$

$$2R_1C_1 = R_2C_2$$

To assist in understanding the present disclosure, simulation results are now discussed. It should be understood that these simulation results are for the purpose of illustration only, and are not intended to be limiting or promissory.

Figure 4:
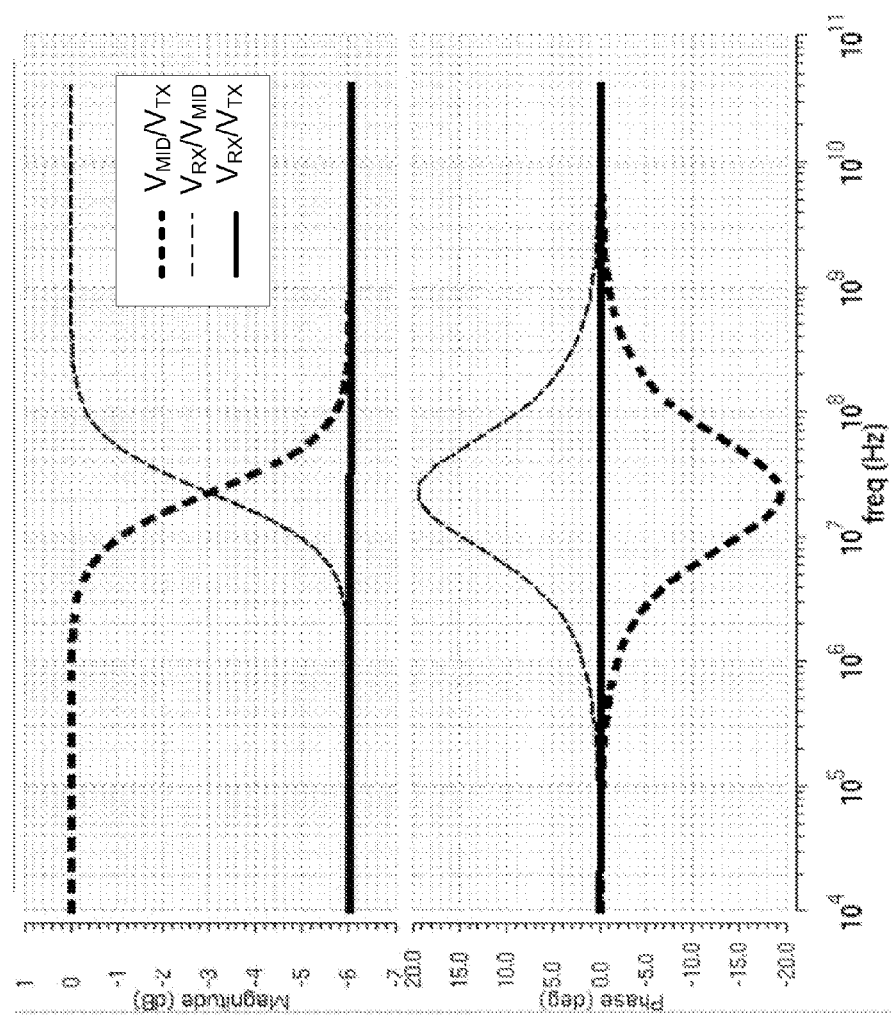
FIG. 4 is a simulated Bode diagram of the example system of FIG. 3.

A simulation was performed for the example system 300, using the parameters: $R_3=50Ω$, $R_1=50Ω$, $C_1=100$ pF, $C_3=C_2=1$ pF, and $R_2=10$ kΩ. These parameter values may represent reasonable and practical resistance and capacitance values for implementation. Variations of these parameters may be suitable in practice (e.g., depending on application requirements), for example resistance values may vary by +/−20% and capacitance values may vary by up to 200%. FIG. 4 presents results of this simulation as a Bode diagram, with reference to voltages $V_{RX}$, $V_{MID}$ and $V_{TX}$ as indicated in FIG. 3. As may be observed in FIG. 4, the response of the first stage 202 (and including the transmission channel 304), given by $V_{MID}/V_{TX}$, demonstrates a low-pass response. The response of the second stage 206, given by $V_{RX}/V_{MID}$, demonstrates a high-pass response that cancels out the first stage 202. The overall transfer function of the system 300, given by $V_{RX}/V_{TX}$, thus provides a flat response at −6 dB.

Examples disclosed herein provide AC coupled RX termination for singled-ended signals. The disclosed examples may address disadvantages of prior art approaches, such as increased power consumption and/or DC wander for single-ended mode signals, particularly for input data with long CIDs. The example two-stage AC coupled termination described herein may address such disadvantages, over a range of data rates (e.g., 1 Gbps to 30 Gbps, or more), without requiring significantly higher power consumption or added complexity. Further, the size of the termination circuit may be scaled down, as desired, for example to meet the requirements of USR devices or other low-power receivers or transceivers.

The embodiments described herein may be applicable to a wide range of network systems, storage system, computing systems, and/or mobile systems. These techniques may also apply to any applications that may require high-speed and/or power-efficient interconnects.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A termination circuit for a receiver receiving a single-ended signal, the termination circuit comprising:
    a first stage for receiving input from an input port of the receiver, the first stage having a low-pass transfer function having a first pole/zero pair; and
    a second stage for outputting to one or more further stages of the receiver, the second stage being coupled to the first stage, the second stage having a high-pass transfer function, the high-pass transfer function having a second pole/zero pair that cancels out the first pole/zero pair;
    wherein the termination circuit provides AC-coupled termination for the single-ended signal.

2. The termination circuit according to claim 1, wherein the first stage comprises a first resistor in series with a first capacitor, the first resistor and the first capacitor being coupled at one end directly to the input port and at another end directly to ground.

3. The termination circuit according to claim 2, wherein the first resistor has a resistance of approximately 50 Ω+/−20%.

4. The termination circuit according to claim 3, wherein the first capacitor has a capacitance in the range of approximately 50 pF to approximately 500 pF.

5. The termination circuit according to claim 4, wherein the capacitance of the first capacitor is approximately 100 pF.

6. The termination circuit according to claim 2, wherein the second stage comprises a second capacitor with one end directly coupled to the input port and another end directly coupled to an output of the termination circuit, and a second resistor in series with a third capacitor, the second resistor and the third capacitor being coupled at one end directly to the output of the termination circuit and at another end directly to ground.

7. The termination circuit according to claim 6, wherein the second capacitor and the third capacitor have approximately equal capacitance.

8. The termination circuit according to claim 7, wherein the first resistance, second resistance, first capacitance, and second capacitance are selected to satisfy the condition $2R_1C_1=R_2C_2$, where $R_1$ is resistance of the first resistor, $C_1$ is capacitance of the first capacitor, $R_2$ is resistance of the second resistor, $C_2$ is capacitance of the second capacitor, and the third capacitor has capacitance approximately equal to capacitance of the second capacitor.

9. The termination circuit according to claim 8, wherein $R_1=50\Omega$, $C_1=100$ pF, $C_2=1$ pF, and $R_2=10$ kΩ.

10. The termination circuit according to claim 1, wherein the termination circuit consumes power less than approximately 2 pJ/bit.

11. A receiver for receiving a single-ended signal, the receiver comprising:
   an input port for receiving the single-ended signal;
   a termination circuit comprising:
      a first stage coupled to the input port of the receiver, the first stage having a low-pass transfer function having a first pole/zero pair; and
      a second stage coupled to the first stage, the second stage having a high-pass transfer function, the high-pass transfer function having a second pole/zero pair that cancels out the first pole/zero pair;
   wherein the termination circuit provides AC-coupled termination for the single-ended signal; and
   one or more further stages coupled to output of the termination circuit, for processing the single-ended signal.

12. The receiver according to claim 11, wherein the first stage of the termination circuit comprises a first resistor in series with a first capacitor, the first resistor and the first capacitor being coupled at one end directly to the input port and at another end directly to ground.

13. The receiver according to claim 12, wherein the second stage of the termination circuit comprises a second capacitor coupled between the input port and one of the one or more further stages, and a second resistor in series with a third capacitor, the second resistor and the third capacitor being coupled at one end directly to the one of the one or more further stages and at another end directly to ground.

14. The receiver according to claim 13, wherein the first resistance, second resistance, first capacitance, and second capacitance are selected to satisfy the condition $2R_1C_1=R_2C_2$, where $R_1$ is resistance of the first resistor, $C_1$ is capacitance of the first capacitor, $R_2$ is resistance of the second resistor, $C_2$ is capacitance of the second capacitor, and the third capacitor has capacitance approximately equal to capacitance of the second capacitor.

15. The receiver according to claim 11, wherein the termination circuit consumes power less than approximately 2 pJ/bit.

16. A low-power communication device comprising a receiver, wherein the receiver comprises:
   an input port of the receiver for receiving a single-ended signal;
   a termination circuit comprising:
      a first stage coupled to the input port of the receiver, the first stage having a low-pass transfer function having a first pole/zero pair; and
      a second stage coupled to the first stage, the second stage having a high-pass transfer function, the high-pass transfer function having a second pole/zero pair that cancels out the first pole/zero pair;
      wherein the termination circuit provides AC-coupled termination for the single-ended signal; and
   one or more further stages of the receiver coupled to output of the termination circuit, for processing the single-ended signal.

17. The device according to claim 16, wherein the first stage of the termination circuit comprises a first resistor in series with a first capacitor, the first resistor and the first capacitor being coupled at one end directly to the input port and at another end directly to ground.

18. The device according to claim 17, wherein the second stage of the termination circuit comprises a second capacitor coupled between the input port and one of the one or more further stages, and a second resistor in series with a third capacitor, the second resistor and the third capacitor being coupled at one end directly to the one of the one or more further stages and at another end directly to ground.

19. The device according to claim 18, wherein the first resistance, second resistance, first capacitance, and second capacitance are selected to satisfy the condition $2R_1C_1=R_2C_2$, where $R_1$ is resistance of the first resistor, $C_1$ is capacitance of the first capacitor, $R_2$ is resistance of the second resistor, $C_2$ is capacitance of the second capacitor, and the third capacitor has capacitance approximately equal to capacitance of the second capacitor.

20. The device according to claim 16, wherein the termination circuit consumes power less than approximately 2 pJ/bit.

* * * * *